United States Patent [19]

Kaji et al.

[11] Patent Number: 4,794,043
[45] Date of Patent: Dec. 27, 1988

[54] CARBON PRODUCT COMPRISING CARBONACEOUS MATERIALS JOINED TOGETHER, SAID CARBON PRODUCT FOR ELECTRODE SUBSTRATE OF FUEL CELLS AND PROCESS FOR PRODUCTION THEREOF

[75] Inventors: Hisatsugu Kaji, Iwaki; Kuniyuki Saitoh, Abiko, both of Japan

[73] Assignee: Kureha Kagaku Kogyo Kabushiki Kaisha, Tokyo, Japan

[21] Appl. No.: 854,607

[22] Filed: Apr. 22, 1986

[30] Foreign Application Priority Data

Apr. 30, 1985 [JP] Japan .................................. 60-93494
Apr. 30, 1985 [JP] Japan .................................. 60-93495

[51] Int. Cl.$^4$ ........................... B32B 9/00; B32B 3/10; B32B 3/20; H01M 4/96
[52] U.S. Cl. ................................ 428/408; 428/137; 428/158; 429/44
[58] Field of Search .............. 428/408, 688, 131, 134, 428/137, 138, 188; 427/115; 501/99; 502/101; 429/40, 44; 423/447.2

[56] References Cited

U.S. PATENT DOCUMENTS

| | | | |
|---|---|---|---|
| 3,404,061 | 11/1968 | Shane et al. ..................... | 428/408 X |
| 4,279,952 | 7/1981 | Kodama et al. ................. | 428/408 X |
| 4,434,206 | 2/1984 | Fukuda et al. .................. | 428/408 X |
| 4,459,342 | 7/1984 | Shigeta et al. . | |
| 4,506,028 | 3/1985 | Fukuda et al. . | |
| 4,515,871 | 5/1985 | Shirogami et al. .............. | 429/40 X |
| 4,522,895 | 6/1985 | Shigeta et al. . | |
| 4,547,418 | 10/1985 | Shigeta et al. . | |
| 4,567,086 | 1/1986 | Fukuda et al. . | |
| 4,579,789 | 4/1986 | Fukuda et al. .................. | 427/115 X |
| 4,664,988 | 5/1987 | Shigeta et al. .................. | 429/34 X |
| 4,675,094 | 6/1987 | Kaminaga et al. .............. | 204/294 |
| 4,686,072 | 8/1987 | Fukuda et al. .................. | 429/44 X |

FOREIGN PATENT DOCUMENTS

| | | |
|---|---|---|
| 905199 | 9/1962 | United Kingdom . |
| 1480922 | 7/1977 | United Kingdom . |
| 2157277 | 4/1985 | United Kingdom . |
| 2128395 | 1/1986 | United Kingdom . |
| 2169273 | 7/1986 | United Kingdom . |

*Primary Examiner*—Marion C. McCamish
*Assistant Examiner*—Susan S. Rucker
*Attorney, Agent, or Firm*—Nixon & Vanderhye

[57] ABSTRACT

Disclosed herein is a carbon product comprising at least two carbonaceous materials and one flexible graphite sheet interposed between said two carbonaceous materials, said two carbonaceous materials and said flexible graphite sheet having been joined together and integrated by calcination in an inert atmosphere as one carbon body, and the joining surface of at least one of said carbonaceous materials comprising both joining parts and non-joining parts which have an optional shape and are uniformly arranged on the joining surface, said carbon product as the electrode substrate of fuel cells, and a process for producing the same.

17 Claims, 3 Drawing Sheets

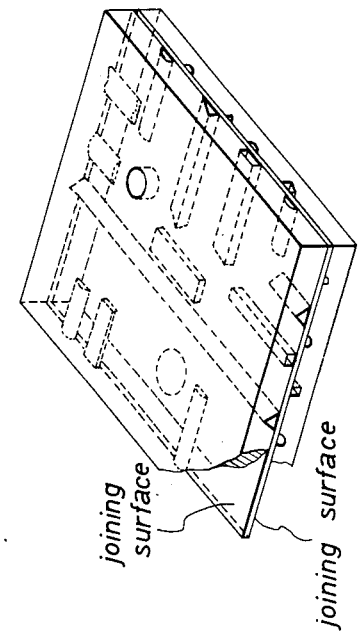
Fig. 1 (2)
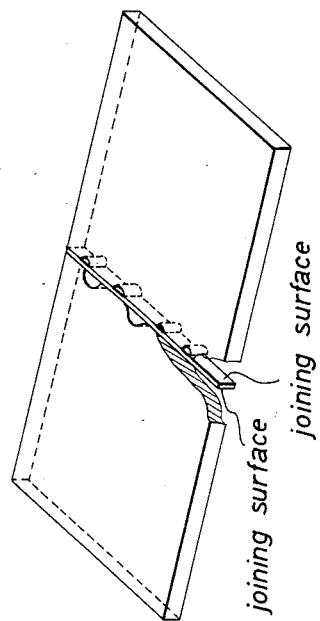
Fig. 1 (1)

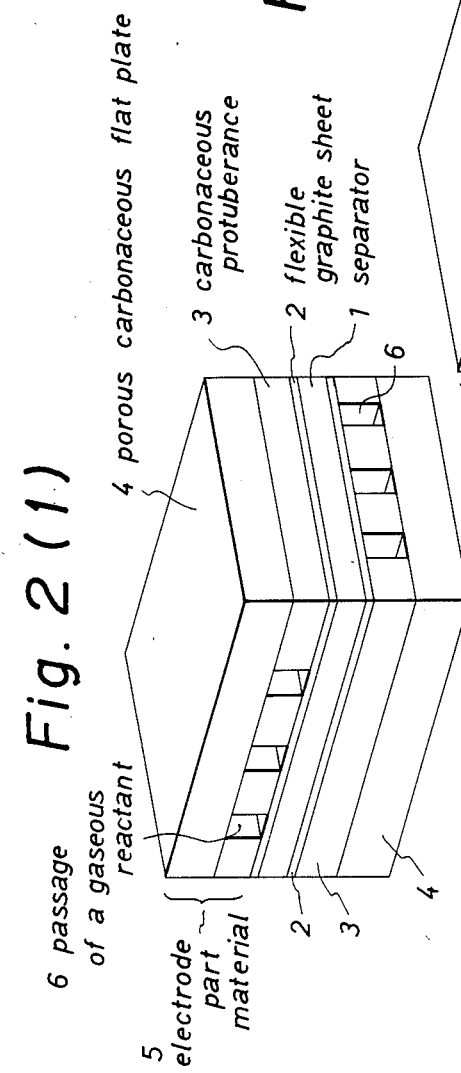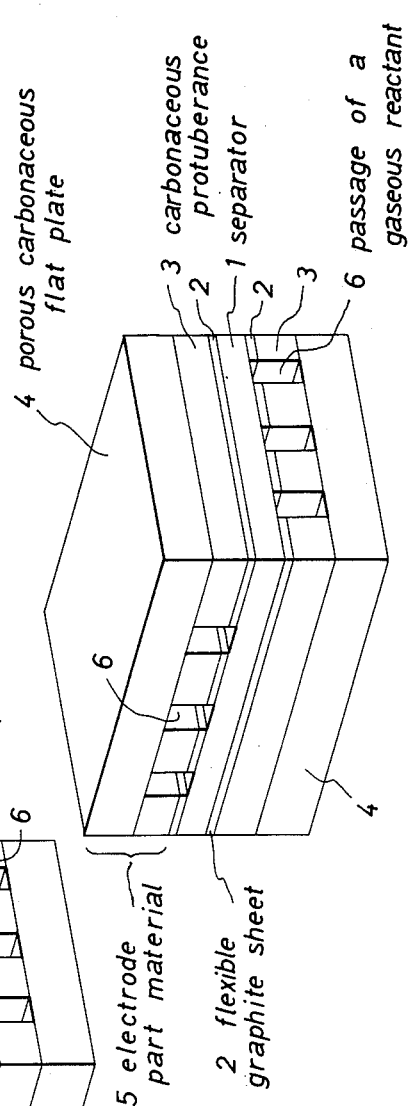

CARBON PRODUCT COMPRISING CARBONACEOUS MATERIALS JOINED TOGETHER, SAID CARBON PRODUCT FOR ELECTRODE SUBSTRATE OF FUEL CELLS AND PROCESS FOR PRODUCTION THEREOF

BACKGROUND OF THE INVENTION

The present invention relates generally to carbonaceous materials and the products obtained therefrom, and particularly relates to the large-sized composite carbonaceous products prepared by mutually joining the carbonaceous materials together, the process for producing thereof, the above-mentioned composite carbonaceous products for use in electrode substrate of fuel cells and the process for producing the same.

More in detail, the present invention relates to the carbonaceous product comprising the carbonaeeous materials and the flexible graphite sheet interposed between the carbonaceous materials, the carbonaceous materials and the flexible graphite sheet having been joined together and integrated by calcination in an inert atmosphere as one carbon body, the joining surface of at least one of the carbonaceous materials comprising both joining parts and non-joining parts which have an optional shape and uniformly arranged on the joining surface, and the part of the flexible graphite sheet corresponding to the above-mentioned non-joining part having been deleted or not deleted, the process for producing the same, the above-mentioned composite carbonaceous products for use in electrode substrate of fuel cells and the process for producing the same.

The present invention still more relates to the carbonaceous product as the electrode substrate of fuel cells, which product has a united one body-structure comprising a carbonaceous material for the separator, the flexible graphite sheets disposed outside the separator, a plurality of carbonaceous protuberances disposed outside the flexible graphite sheets and the porous carbonaceous flat plates disposed outside the protuberances, wherein the passage of the gaseous reactants is formed by the combination of (1) the flexible graphite sheet or the flexible graphite sheet and the carbonaceous material for the separator, (2) a plurality of carbonaceous protuberances and (3) the porous carbonaceous flat plate, and the process for producing the same.

In the carbon product according to the present invention, the joining surface of the carbonaceous materials, which is joined to the flexible graphite sheet, is fabricated to have the uniformly arranged joining parts and non-joining parts with an optional shape, thereby preventing the focussing of stresses on the joining surface.

By such a fabrication, large-sized products can be produced and since the product has been made to be one body in the carbonized state, the electric- and thermal resistances of the product are small and the strength of the product is large.

Accordingly, the fields in which the most of these specific properties can be made are broad such as in the electrode substrate for a fuel cell, etc.

In recent years, carbonaceous molded articles comprising carbonaceous materials such as carbon fibers, carbon particles, etc. as the basic material have been used in various industrial fields, and with the technical progress and increase of demands, requirements of higher order such as improvements of productivity and physical specificities of the articles have been raised more and more.

Although the carbonaceous materials are excellent in physical properties as a material, for instance, corrosion-resistance, electric conductivity, mechanical strength, etc., in order to make the most of these excellent physical properties still effectively, a development of the composite carbonaceous materials prepared by combining and joining carbonaceous materials which are the same or different from each other in quality has been promoted. Hitherto, such composite carbonaceous materials have been used as the carbon product prepared by only adhering a plurality of the materials with an adhesive, and there are problems in such products concerning corrosion resistance, electric conductivity, dimensional stability, etc.

In recent years, a process has been devised for solving the above-mentioned problems by adhering the carbonaceous materials togehher with an adhesive and calcining the thus adhered materials in an inert atmosphere.

However, in the case of producing the composite carbonaceous products by such a process there are many occasions of exfoliation of the carbonaceous materials at the joining surface to each other and of forming cracks in the product during the process ,by the difference of the coefficient of thermal expansion- and contraction at calcination between the carbonaceous materials, thereby causing the reduction of the productive yield.

Further, as the demands for relatively large-sized carbon products and/or carbon products of complicated shape have been raised in recent years from the constructional and functional view points, the above-mentioned problems of exfoliation and cracks become to be particularly serious in the production steps on such occasions.

As has been shown above, on the composite carbonaceous materials, the following strict and heavy demands have been imposed.

Namely, in the production thereof, no exfoliation of the carbonaceous materials to each other is caused and no crack is formed in the product, and in the same time, the final product must retain the excellent properties originally possessed by the carbonaceous materials themselves, for instance, mechanical strength, electrical specificities, etc. Namely, there are many difficulties in the production of the composite carbonaceous materials.

In addition, fuel cells of the bipolar separator-type which use the bipolar separator(s) obtained by rib-processing the impermeable thin plate of graphite have been publicly known. On the other hand, the electrode substrate of monopolar-type which has been provided with ribs on one of the surfaces thereof and has the other surface which is a flat electrode surface, in which gaseous reactants permeates from the ribbed surface to the flat electrode surface has been developed. Further on the other hand, as the process for producing the conventional electrode substrate for monopolar type fuel cell, for instance a process wherein short carbon fibers are press-molded has been proposed (refer to U.S. Pat. No. 4,506,028).

These electrode substrates obtained by the conventional process consist of one layer of a wholly uniform construction. Since in such an electrode substrate consisting of a single and uniform layer, in the case where the bulk density is large, the diffusion coefficient of the gaseous reactant is small, the threshold current density is small and in the same time, the retaining amount of the electrolyte solution is small, and accordingly, the reduction of the performance occurs early, namely it has a demerit of short life of the fuel cell. On the other hand, in the case where the bulk density is small, there is a demerit that the mechanical strength such as bending strength thereof is low.

The present inventors have offered an electrode substrate having excellent physical properties, prepared from short carbon fibers as the basic material, wherein the passage of the gaseous reactant is formed near the center of the thickness of the porous carbonaceous layer as the gas-diffusion layer not by mechanical processing but by easier press-molding and heating treatment, the electrode substrate and the separator having been made to be one body in the carbonized state (refer to U.S. Pat. No. 4,522,895). By the just-mentioned offering, it has become possible to use an electrode substrate of a large gas diffusion coefficient, in other words, an electrode substrate having a gas-diffusing part of a small bulk density. In this type of electrode substrate, since the separator and the electrode substrate are integrated as one carbon body the contact resistance can be reduced sharply as compared to that in the conventional monopolar- and bipolar type electrode substrate. In the above-mentioned electrode substrate offered by the present inventors, the desirable elongated gas holes could be formed in the porous carbonaceous layer not by the rib-processing and boring but by the process of forming the porous carbonaceous layer from short carbon fibers as the basic material while using a binder of thermosetting resin having a specified carbonization yield and a micropore regulator having a specified granular size and thermally decomposing at a temperature of higher than the molding temperature.

However, in the step of carbonizing and calcining of the molded bodies in the process of producing the electrode substrate, the exfoliation of the porous carbonaceous layer and the gas-impermeable layer (the dense carbonaceous layer) to each other was inevitable, particularly in the large-type electrode substrate having the large surface of the substrate in spite of modifying the method of elevating the temperature of the molded materials to the temperature of calcination, resulting in the low production yield. Accordingly, fundamental improvement has been desired.

The reason why the exfoliation occurs in the step of calcination (to the maximum temperature of 3000° C.) lies in the difference of the thermal expansion coefficient between the porous carbonaceous layer and the gas-impermeable layer (or the separator) in the heating step or in the difference of thermal contraction coefficient between both layers in the cooling step to room temperature after completing the calcination.

Accordingly, in order to offer the carbon product as the electrode substrate for fuel cells which solves the above-mentioned demerit, the difference of the thermal expansion and the thermal contraction coefficients at calcination between both layers is to be reduced or eliminated by interposition of a buffering layer which exhibits a function of absorbing the above-mentioned thermal expansion and contraction between both layers.

As the buffering material, the present inventors have aimed at a commercialized flexible graphite sheet which has relatively large coefficients of thermal expansion and contraction, an adhesive property to an adhesive and a relatively low permeability to gases. The flexible graphite sheet is obtained by press-molding of the so-called, expanded graphite particles prepared by acid-treatment of natural graphite, thereby expanding the interlayer of carbon-carbon bondings. The surface of the thus obtained flexible graphite sheet is scaly, and is somewhat gas-permeable, and accordingly, it has an adhesive property because of the possibility of impregnation of an adhesive. Since the used graphite sheet is flexible, it is well suitable for absorption of the thermal expansion and contraction.

As a result of studying the method for mutually joining the carbonaceous materials in the purpose of producing the composite carbonaceous products, the present inventors have found that (1) by interposing the above-mentioned flexible graphite sheet between the porous carbonaceous layer and the carbonaceous material for the separator and adhering the flexible graphite sheet to the porous carbonaceous layer and to the carbonaceous material for the separator via a carbonizable adhesive, the interlayer exfoliation which has hitherto been a large problem can be prevented and the production of the large-type carbonaceous electrode substrate becomes possible, and (2) by (a) processing the electrode carbonaceous layer into the protuberant parts and the flat plate part and joining the protuberant parts to the carbonaceous materials for the separator via the flexible graphite sheet, or (b) joining the flexible graphite sheets onto both of the surfaces of the carbonaceous material for the separator and after providing the carbonaceous protuberant parts on outer surfaces of the thus joined flexible graphite sheets and joining the thus provided protuberant parts onto the carbonaceous flat plate parts, thereby forming the passage of the gaseous reactants, it becomes possible to make the whole product thinner, and to reduce the electric- and thermal resistances, and further it becomes possible to obtain the composite carbonaceous products in large sizes and the composite carbonaceous products for electrode substrate having less demerits such as curvature, cracks and exfoliation because of the dispersion of the stress at the time of calcination, the composite carbonaceous product have been formed in one body as carbon, and based on the above-mentioned findings, the present inventors have attained the present invention.

Namely, the objective of the present invention is to provide a carbon product (a composite carbonaceous product) as the electrode substrate for fuel cells, comprising a carbonaceous material for a separator, two flexible graphite sheets provided on the both surfaces of the carbonaceous material, a plurality of carbonaceous protuberances provided on each outer surface of the two flexible graphite sheets and a pair of porous carbonaceous flat plates provided on each outermost surface of the product, the whole materials of the product having been integrated in one body as carbon by calcination in an inert atmosphere, the passage for the gaseous reactants having been formed by the combination of (1) the above-mentioned flexible graphite sheet or the flexible graphite sheet and the carbonaceous material for the separator, (2) the plurality of the carbonaceous protuberances and (3) the porous carbonaceous flat plate, the ratio ($Sr/Se$) of the total area of the cross section of the above-mentioned plurality of carbonaceous protuberances ($Sr$), which cross section is parallel to the surface of the above-mentioned carbonaceous material for the above-mentioned separator, to the total area of the joining surface of the porous carbonaceous flat plate ($Se$) being from 0.2 to 0.8 and the space between the two neighbouring carbonaceous protuberances (d) (refer to FIG. 3) being not more than 10 mm.

Further, the objective of the present invention is to provide a large-type carbonaceous composite material which has excellent specific properties and is free from curvature, crack and exfoliation as the product.

Furthermore, the objective of the present invention is also to provide a process for production of a large-type carbonaceous composite material which does not exhibit the demerits due to the conventional techniques and particularly, is free from curvature, crack and exfoliation.

SUMMARY OF THE INVENTION

In a first aspect of the present invention, there is provided a carbon product comprising carbonaceous materials and flexible graphite sheets interposed between the carbonaceous materials, wherein the carbonaceous materials and the flexible graphite sheet are joined together, the thus joined material are integrated as one carbon body by calcination thereof in an inert atmosphere, and a joining surface of at least one of the carbonaceous materials comprises both joining parts and non-joining parts which have an optional shape and are uniformly arranged on the joining surface, and a process for producing the carbon product.

In a second aspect of the present invention, there is provided a carbon product as an electrode substrate for fuel cells, which the substrate comprises (1) a carbonaceous material for a separator, (2) flexible graphite sheets placed on each of the two surfaces of said carbonaceous material for a separator, and (3) a plurality of carbonaceous protuberances placed on outer surfaces of the flexible graphite sheets and a pair of porous carbonaceous flat plates placed on outermost surfaces of the carbon product as an electrode part material, the whole materials of the carbon product having been integrated by calcination in an inert atmosphere as one carbon body, and a process for producing the same.

BRIEF EXPLANATION OF DRAWINGS

Of the attached drawings, FIG. 1(1) and FIG. 1(2) are the schematic representation of the method of joining the carbonaceous materials adopted in Examples and Comparative Examples; FIG. 2(1) and FIG. 2(2) are the oblique view of the carbon product as the electrode substrate for fuel cells according to the present invention.

DETAILED DESCRIPTION OF THE INVENTION

Figure 3:
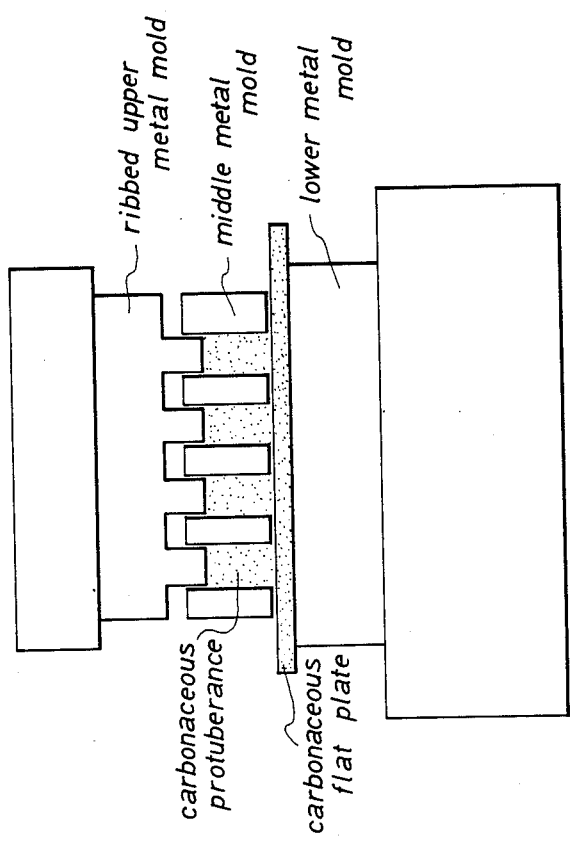
FIG. 3(1) and FIG. 3(2) show the cross-sectional shape of the carbonaceous protuberance and an example of the arrangement thereof and FIG. 4 shows an example of metal molds preferably used according to the present invention.

The afore-mentioned objectives of the present invention have been attained by the carbon product as an electrode substrate produced by the process comprising the steps of interposing a flexbble graphite sheet between a pair of carbonaceous materials, joining the carbonaceous materials and the flexible graphite sheet together while providing non-joining parts of an optional shape arranged uniformly on the joining surface of at least one of the carbonaceous material so as to occupy from 20 to 80%, preferably from 30 to 70% of the joining surface of the carbonaceous material, and calcining the whole material at a temperature of not lower than 800° C. in an inert atmosphere, thereby making the whole material to be one carbon body.

The flexible graphite sheet used according to the present invention is produced by subjecting graphite particles of not more than 5 mm in diameter to acid treatment and heating the thus acid-treated particles, thereby obtaining expanded graphite particles, and compressing the thus obtained expanded graphite particles. The flexible graphite sheet has the thickness of not more than 1 mm, bulk density of 0.5 to 1.5 g/cm$^3$, and coefficient of compression strain (namely, the strain ratio at a compression load of 1 kg/cm$^2$) of not less than $10^{-4}$ cm$^2$/kg, preferably not less than $10^{-3}$ cm$^2$/kg. As an instance of commercialized flexible graphite sheets suitable for the present invention, GRAFOIL ® (made by Union Carbide Corporation, USA) may be mentioned.

In addition, the parts of the flexible graphite sheet, which correspond to the non-joining parts of the carbonaceous material, may be omitted.

The carbonaceous materials joined together interposing the flexible graphite sheet therebetween according to the process of the present invention may be the same or different from each other from the view point of physical properties thereof. As an example of mutually different carbonaceous materials, a carbonaceous material for a separator and a carbonaceous material for an electrode part material of the fuel cell may be mentioned.

As examples of the carbonaceous raw material used for producing the carbon product according to the present invention, the following materials may be mentioned, however, the raw materials are not limited thereto.

(1) Molded and shaped carbonaceous materials comprising carbon aggregate material selected from carbon fibers, carbon particles and oxidized pitch particles, and a binder, optionally and a pore regulator such as organic granular substances.

As a binder, for instance, a combined one or more material selected from phenol resins, furan resins, petroleum pitches and coal pitches may be mentioned. As a pore regulator, for instance, particles of polyvinylalcohol may be mentioned.

(2) Carbonaceous material obtained by calcining the carbonaceous material under (1) at a temperature of not lower than 800° C. in an inert atmosphere.

(3) Molded and shaped carbonaceous material comprising an aggregate material of graphite particles and/or the easily graphitizable carbon particles, and a binder such as coal pitch, phenol resin, furan resin, epoxy resin and petroleum pitch.

(4) Carbonaceous material obtained by calcining the carbonaceous material under (3) at a temperature of not lower than 800° C. in an inert atmosphere.

According to the present invention, the above-mentioned raw carbonaceous materials are used by an optional combination thereof.

In the case where the difference of the linear expansion and contraction coefficients at calcination between the two carbonaceous materials to be joined is larger than a certain limit, it is impossible to join the two carbonaceous materials even if the flexible graphite sheet is used between them and the non-joining parts are provided on one of the joining surfaces of at least one of the carbonaceous raw materials. Although the absolute value of the difference of the linear expansion and contraction rates (%) at calcination between the two carbonaceous materials to be joined together is influenced by the thickness of the flexible graphite sheet used, the distortion rate, the maximum temperature of calcination, the ratio of the area of the non-joining parts on the joining surface of the carbonaceous material to the area of the joining surface and the size of the carbon product (the area of the joining surface), it is at most 3%, preferably not more than 1%.

Even in the case where the carbonaceous materials are the carbonaceous material for the separator of a fuel cell and the carbonaceous material for the electrode part material, the above-mentioned physical properties are required.

According to the present invention, on the joining surface of the carbonaceous raw material which is joined to the flexible graphite sheet, joining parts and non-joining parts which have an optional shape and are uniformly arranged on the joining surface, are provided. Although the shape and arrangement of such joining parts and non-joining parts are optional, it is desirable to uniformly arrange such parts as a whole in order to present the curvature, exfoliation, crack etc. In addition, on the joining surface of at least one of the carbonaceous materials, non-joining parts should be provided.

The ratio of the total area of the non-joining parts to the total area of the joining surface is selected from the range of from 20 to 80%, preferably from 30 to 70% for obtaining the desired result.

In the case where the above-mentioned ratio is over 80%, the ratio of the total area of the joining parts to the total area of the joining surface becomes smaller than 20%, resulting in the easier exfoliation and cracks at calcination, and on the other hand, in the case where the ratio is under 20%, the stress-dispersing effect on the joining surface is deteriorated.

By providing, according to the present invention, the non-joining parts on the surface to be joined of at least one of the carbonaceous materials, not only the stress between the joining surface of the thus treated surface and the flexible graphite sheet is relaxed but mlso the stress between the joining surface of the other carbonaceous materials and the flexible graphite sheet is relaxed, thus resulting in the carbon product free from curvature, cracks and exfoliation even without providing non-joining parts on the surface to be joined of the other carbonaceous material. For instance, one of the joining surfaces is made to all-over joining and on the other one of the joining surfaces, joining parts and non-joining parts may be provided.

For instance, in the production of the electrode substrate of a fuel cell, the carbonaceous material for the separator is completely joined overall to the flexible graphite sheet, but the carbonaceous material for elecrrode part material is partially joined to the flexible graphite sheet.

Or else, the non-joining parts may be provided at the optional positions on both the two joining surfaces.

Further, on the flexible graphite sheet, non-joining parts may be provided corresponding to the non-joining parts on the carbonaceous material, and in this case, the non-joining parts may be provided on only the joining surface of one of the carbonaceous materials and also may be provided on the each joining surfaces of the carbonaceous materials. Namely, the parts of the flexible graphite sheet corresponding to the non-joining parts of the carbonaceous materials may be omitted.

As the adhesive used according to the present invention for joining the carbonaceous material to the flexible graphite sheet, in the case of using the molded carbonaceous material, the binder contained therein is used itself as the adhesive in this joining, however, in ordinary cases, any conventional adhesive may be newly used, and among these conventional adhesives, those selected from the group consisting of (1) adhesives prepared by dissolving from 5 to 200 parts by weight of phenol resin, pitch, etc. into 100 parts by weight of a suitable solvent such as methanol, ethanol, acetone and methyl ethyl ketone and (2) adhesives prepared by melting phenol resin, epoxy resin, furan resin, etc. are favorably used, and it is more favorable to use the mixture prepared by blending from 0 to 100 parts by weight of carbon particles of not more than 200 $\mu$m in diameter with 100 parts by weight of the above-mentioned adhesive in order to make the carbon-retaining rate larger in the time of calcination and to uniformly disperse the microscopic carbon joining points.

The thickness of the layer of the adhesive is not particularly limited, however, it is preferable to uniformly apply the adhesive in thickness of not more than 0.5 mm.

The joining of the carbonaceous material and the flexible graphite sheet is carried out at a temperature of higher than the melting point of the binder used as the adhesive by at least 50° C. and under a press-pressure of from 0.1 to 50 kg/cm$^2$.

In the production of the carbon product according to the present invention, the above-mentioned adhesive is applied on the joining parts of the surface of the above-mentioned carbonaceous material, which surface has the non-joining parts (or in the case where the surface having no not-joining parts is joined, the adhesive is applied on the surface having no not-joinigg parts); the above-mentioned flexible graphite sheet is placed thereon; then another carbonaceous material to which the adhesive has been applied on one of the surfaces thereof is placed on the flexible graphite sheet so that the thus applied surface with the adhesive faces to the flexible graphite sheet and the thus piled-up materaals are joined together under the above-mentioned heating and pressure conditions.

After joining the piled-up materials, the thus obtained joined body is subjected to after-hardening for at least 2 hours at the press temperature, and then calcined for about one hour at a temperature of 800° to 3000° C. in an inert atmosphere.

In the step of calcination, it is preferable that the temperature is slowly raised during the step of thermal decomposition at low temperatures at a rate of 100°±50° C./hour up to about 700° C., thereby preventing the occurrence of stress due to the sudden contraction of the hardened material in the time of gasification thereof. In the case where a temperature of the material is rapidly raised during the step of thermal decomposition at low temperatures, exfoliation between the layers and cracks are caused.

In the above-mentioned process for producing the carbon product, the flexible graphite sheet can be produced in situ by placing the expanded graphite particles uniformly on the surface of the above-mentioned carbonaceous material on which the adhesive has been applied and subjecting the thus treated whole materials to molding under the above-mentioned heating and pressing conditions. After drawing the thus molded body out from the press, the thus molded body may be joined to the carbonaceous material to which the adhesive has been applied. In this case, the joining surface of the first carbonaceous material to be applied with the expanded graphite particles is retained in flat.

The carbon product and the carbon product as the electrode substrate for fuel cells obtained according to the present invention exhibit the excellent specific properties originally possessed by the carbonaceous materials themselves and in the same time, as clearly seen in Examples and Comparative Examples, by the action of the flexible graphite sheet interposed between the two carbonaceous materials as a buffering materia of the thermal expansion or contraction of the carbonaceous materials during the time of calcination and by the prevention and dispersion of the concentration of the stress through the non-joining parts having optional shape and having been arranged uniformly on the joining surface of the carbonaceous materials, any exfoliation on the joining surface of the two carbonaceous materials is not experienced without the occurrence of crack in the carbon product. Accordingly, the carbon product is effectively produced inaa favorable production yield. Such an effect of the present invention is clearly seen in the case where the present case is compared to the case of joining carried out by only using an adhesive.

According to the above-mentioned operative effectiveness of the present invention, it is possible to produce large-sized products and products of complicated shape by the process according to the present invention without causing the problems of exfoliation, cracks and curvature. Accordingly, the carbon products and the process for producing thereof are particularly suitable respectively to the carbon prouuct as the electrode substrate for fuel cells and the process for producing the same.

The carbon product according to the present invention as the electrode substrate for fuel cell is explained in detail while referring to the attached drawings as follows.

FIGS. 2(1) and 2(2) are the schematics of the carbon product as the electrode substrate for fuel cell.

The carbon product as the electrode substrate for fuel cells according to the present invention has a 7-layered structure comprising a carbonaceous material for the separator 1, two flexible graphite sheets 2, the carbonaceous protuberances 3, two porous carbonaceous flat plates 4. The whole 7 layers have been integrated as one carbon body by calcination in an inert atmosphere. The passage of the gaseous reactant(s) 6 is provided by the flexible graphite sheet 2, the carbonaceous protuberances 3 and the porous carbonaceous flat plate 4 or by the flexible graphite sheet 2, the carbonaceous material for the separator 1, the carbonaceous protuberance 3 and the porous carbonaceous flat plate 4.

The shape of each of the carbonaceous protuberances 3 and the arrangement of the carbonaceous protuberances on the joining surface are optional and may be suitably selected in considering the preservation of the structure of the electrode part material 5 consisting of the carbonaceous protuberances 3 and the porous carbonaceous flat plate 4 and the physical properties required for the electrode substrate. However, in the present invention, the ratio of the total area of the cross-section of the protuberances 3, which is parallel to the surface of the carbonaceous material for the separator 1, to the area of the upper surface of the flat plate 4 is from 0.2 to 0.8.

Examples of the cross-sectional shape of each of the carbonaceous protuberances 3 and the arrangement thereof are shown in FIGS. 3(1) and 3(2). FIG. 3 is a plane figure of the cross-section of the carbon product cut at nearly the center of the thickness of the carbonaceous protuberance 3. The arrow head shows the flow direction of the gaseous reactant. The space between the adjacent two protuberances is adjusted to be not more than 10 mm in order to form a suitable passage for the gaseous reactant.

FIG. 3(1) shows the plan of the arrangement of rectangular cross-sections of the carbonaceous protuberances, and the protuberances are disposed in the perpendicular and parallel directions to the direction of the flow of gaseous reactant all together (such an arrangement is referred to as the series arrangement). On the other hand, FIG. 3(2) shows the plan of the arrangement of nearly square cross-sections of the carbonaceous protuberances, and although the protuberances disposed parallel to the direction of the flow of gaseous reactant are arranged all together, those disposed perpendicular to the flow of gaseous reactant are arranged alternately (such an arrangement is referred to as the alternating arrangement).

However, those shown in FIG. 3 are examples, and in the present invention, the cross-sectional shape of the carbonaceous protuberance is quite optional and in addition to the rectangular and the square shape, the cross-section may take any optional shape such as optional polygons, circle, ellipse, etc. In addition, the cross-sectional shape perpendicular to the surfaces of the carbonaceous material for the separator and to the direction of the flow of gaseous reactant is also optional, and besides the shape of rectangle as are shown in FIGS. 2(1) and 2(2), the crcss-section may take the shape of squares such as regular square, trapezoid, parallelogram, etc. Furthermore, the arrangement of the carbonaceous protuberances may be any one other than the series arrangement shown in FIG. 3(1) and the alternating arrangement shown in FIG. 3(2). For instance, the protuberances may be arranged so that the gaseous reactant flows in the direction perpendicular to the direction shown by the arrow head in FIG. 3(2).

The minimal requirement of the arrangement of the carbonaceous protuberances is to uniformly distribute the gaseous reactant whithin the passage formed by the protuberances. For instance, the protuberances having rectangular cross-section may continue from one of the ends of the electrode substrate to the other end while mutually connected in the longitudinal direction.

The porous carbonaceous flat plate 4 in the electrode substrate according to the present invention comprises a uniformly porous carbonaceous material and the average bulk density and the gas-permeability thereof are preferably from 0.25 to 0.9 g/cm$^3$ and more than 30 cm$^2$/hour.mmAq, respectively. The porous carbonaceous flat plate having an average bulk density of 0.25 to 0.9 g/cm$^3$ and the gas-permeability of more than 30 cm$^2$/hour.mmAq shows desirable mechanical strength, for instance, bending strength and also shows a favorable resistance to gaseous diffusion. In addition, it is preferable that the porosity of the porous carbonaceous flat plate is from 40 to 85% and the micropores are open pores and that the radius of not less than 60% of the micropores is in the range of from 5 to 50 μm.

The carbonaceous protuberance 3 in the electrode substrate according to the present invention are composed of a uniform carbonaceous material and the bulk density thereof is preferably from 0.40 to 1.8 g/cm$^3$.

The carbonaceous material for the separator in the electrode substrate according to the present invention has preferably the average bulk density of not less than 1.2 g/cm$^3$ and the gas-permeability of not more than 10$^{-5}$ cm$^2$/hour.mmAq. In the case where the average bulk density is less than 1.2 g/cm$^3$, it is impossible to obtain the compactness as the gas-impermeable layer.

The value of the difference of linear expansion and contraction rates (%) at calcination between the carbonaceous material for the electrode part material and the carbonaceous material for the separator is, as has been shown, not more than 3%, preferably not more than 1%.

The flexible graphite sheet 2 is produced, as has been described before, by compressing the expanded graphite particles which have been obtained by subjecting the graphite particles of not more than 5 mm in diameter to acid-treatment and further to heating treatment.

The process for producing the carbon product as the electrode substrate according to the present invention is described in detail as follows.

At first, the electrode part material (shown as 5 in FIG. 2(1)) is produced. As the material for the porous carbonaceous flat plate, a material prepared by impregnating a sheet of carbon fiber paper made from carbon fibers as the basic material by paper making (for instance, refer to U.S. Pat. No. 3,998,689) with a phenol resin. Particularly, the material prepared by impregnating a sheet of carbon fiber paper made of 50 to 500 g/m$^2$ of carbon fibers of 3 to 10 mm in length, 10 to 100 g/m$^2$ of polyvinyl alcohol fibers of 3 to 10 mm in length and 1 to 100 g/m$^2$ of pulp as joints by paper making with a dilute 1 to 30% by weight solution of phenol resin dissolved in methanol, ethanol or methyl ethyl ketone is favorably used for that purpose.

As another material for the porous carbonaceous flat plate, a material prepared by molding a mixture of short carbon fibers, a binder and an organic granular substance by hot-pressing may be mentioned (refer to U.S. Pat. No. 4,522,895). Of such materials, the material obtained by molding a mixture consisting of 20 to 60% by weight of carbon fibers of not more than 2 mm in length, 20 to 50% by weight of phenol resin and 20 to 50% by weight of an organic granular substance at a molding temperature of 100° to 180° C. and under a molding pressure of 1 to 100 kg/cm$^2$ for 1 to 60 min. is favorable. Such a mixture is also use as the raw material for the carbonaceous protuberant parts.

As the raw material for the carbonaceous protuberant parts, a mixture of carbon particles and a binder is also used.

The process for preparing the carbonaceous material for the electrode part material is described as follows while referring to FIG. 4.

Figure 4:
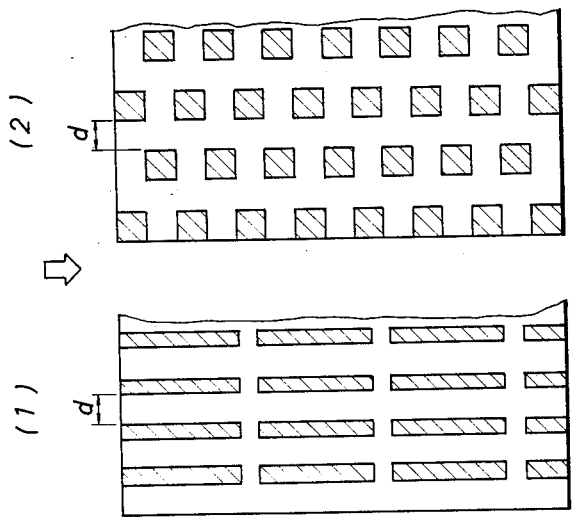

As seen in FIG. 4, by placing a material for the porous carbonaceous flat plate on the lower metal mold, placing the middle metal mold for forming the protuberant parts on the thus placed material, supplying a material for the protuberant parts into the hollow space of the middle metal mold and molding the supplied material by hot-pressing with a ribbed upper metal mold, the protuberant parts are formed on the flat plate. The press-molding is carried out at a molding temperature of 100° to 280° C. under a molding pressure of 1 to 100 kg/cm$^2$ for 1 to 60 min.

In addition, the flat plate part and the protuberant parts may be molded into one body of the carbonaceous material for electrode part material by using the above-mentioned mixture. For instance, as are shown in FIG. 4, the above-mentioned mixture is introduced into another metal mold having an outer frame and is hot-pressed therein under the conditions of at 100° to 280° C., under 1 to 100 kg/cm$^2$ for 1 to 60 min.

The thus obtained carbonaceous material for the electrode part material may be subjected to the succeeding process directly or after further subjecting thereof to calcination at a temperature of not lower than 800° C. in an inert atmosphere.

The thus obtained carbonaceous material for the electrode part material is directly or after subjecting to calcination, joined to the carbonaceous material for the separator interposing the flexible graphite sheet therebetween so as to obtain the predetermined shape.

As the adhesive used on each of the joining surfaces, any adhesive used conventionally in adhering carbonaceous materials to each other may be used, however, particularly as the adhesive used for joining the molded body of the electrode part material with the above-mentioned flexible graphite sheet, any adhesive used for joining a conventional carbonaceous material with a flexible graphite sheet may be used without any inconveniences. The thickness of the layer of the above-mentioned adhesive between the two layers is not specifically limited, however, it is preferably not more than 0.5 mm, the application of the adhesive preferably being uniform as mentioned previously.

It is preferred that the joining of the carbonaceous material and the flexible graphite sheet and the calcination of the thus joined body are carried out under the conditions following those in the above-mentioned joining of the conventional carbonaceous material and a flexible graphite sheet and in the calcination of the thus joined body.

As the flexible graphite sheet for the carbon product as the electrode substrate according to the present invention, although a commercialized product may be used, it may be prepared directly from the expanded graphite particles in a metal mold also in the case of producing the electrode sbbstrate. For instance, the expanded graphite particles of a bulk density of 0.003 to 0.02 are supplied into a metal mold in a predetermined amount; the carbonaceous material for the separator to which an adhesive is applied on both the surfaces thereof is supplied; the expanded graphite particles are supplied thereon in a predetermined amount and the thus supplied materials are subjected to hot-pressing under the conditions of at a temperature of 100° to 180° C., under a pressure of 1 to 200 kg/cm$^2$ for 1 to 60 min.

In addition, the carbon product as the electrode substrate according to the present invention can be produced also as follows. Namely, the two flexible graphite sheets are respectively joined to each of the two surfaces of the carbonaceous material for the separator; the carbonaceous protuberant parts are formed on each outer surface of the both flexible graphite sheets; the thus formed body is joined, or after subjecting to calcination, to the porous carbonaceous material for the flat plate (which may have been calcined) and the thus joined material is calcined in an inert atmosphere.

In the thus produced carbon product as the electrode substrate according to the present invention, since the passage of the gaseous reactant in the porous carbonaceous layer is formed by a plurality of the carbonaceous protuberances, the distance from the passage of the gaseous reactant to the separator is reduced as compared to elongated holes of U.S. Pat. No. 4,522,895 and the thickness becomes thinner (for instance about 0.5 mm per one substrate) resulting in the reduced electrical- and heat resistance by 1 to 15%. In addition, by providing divided protuberances, the two dimensional softness of the substrate has been obtained. Namely, the stress at the time of calcination is dispersed resulting in the possibility of producing a carbon product of a larger type with the remarkably improved productive yield.

In addition, the gaseous reactant can be made to be supplied uniformly throughout the electrode substrate.

As seen in the data of the frequency of occurrence of exfoliation in the time of calcination shown in Table 1, in the above-mentioned electrode substrate, a 3-layered structure was adopted while using a carbon plate as the gas-impermeable layer, and the frequency of occurrence of exfoliation in such an electrode substrate is raised as the size of the electrode substrate is increased resulting in the reduction of productive yield. On the other hand, according to the process of the present invention, not only the frequency of ooccurrence of exfoliation shown according to the sizes of the electrode substrate is remarkably small, but also the substantial production of the electrode substrate of large sizes can be carried out.

TABLE 1

| Frequency of Occurrence of Exfoliation | | | | |
|---|---|---|---|---|
| Size of Electrode substrate (mm square) | 100 | 170 | 350 | 650 |
| Recent application*[1] (3-layered structure) (%) | 5 | 20 | 45 | 75 |
| Present invention*[2] shown in Examples 3-6 (7-layered structure) (%) | 0 | 0 | 0 | 0 |

Notes:
*[1] composed of one carbon plate of 0.6 mm in thickness and two layers of porous carbonaceous material of 1.5 mm in thickness.
*[2] composed of one separator of 0.4 mm in thickness, two sheets of flexible graphite of 0.1 mm each in thickness and two layers of electrode part material of 1.4 mm in thickness each.

The present invention will be explained more in detail while referring to the following non-limitative Examples and Comparative Examples.

EXAMPLE 1

After preparing various carbonaceous materials shown below of a dimension of 150 mm square and 20 mm in thickness, a flexible graphite sheet (GRAFOIL ®) was interposed between each pair of the thus prepared carbonaceous materials in each combination shown in Table 2 and after adhering the three pieces of the materials, the thus prepared, 3-layered body was calcined at 2000° C. in a nitrogen atmosphere. The experiment was repeated 10 times under the same combination of the carbonaceous materials, and results are shown in Table 2, the number in Table 2 being the number of the products showing good adherence.

The thus obtained state of joining is shown in FIG. 1, FIG. 1(1) showing the joining of the two side of 150 mm×20 mm and FIG. 1(2) showing the joining of the two surfaces of 150 mm square.

The carbonaceous materials, the flexible graphite sheet, the adhesive and the conditions of joining are as follows.

(1) Carbonaceous materials (1)-1 Carbonaceous material No. 1

After blending 60% by weight of short carbon fiber (made by KUREHA KAGAKU KOGYO K.K. under the trade name of M-204 S, of average diameter of 14 micrometers and average length of 400 micrometers) and 40% by weight of a phenol resin (made by ASAHI YUKIZAI K.K. under the trade name of RM-210 of resol type), the thus obtained mixture was supplied into a predetermined metal mold and press-molded under the conditions of a molding temperature of 130° C., a oolding pressure of 50 kg/cm² and a pressure-retaining time of 20 min to obtain Carbonaceous material No. 1.

(1)-2 Carbonaceous material No. 2

The uncalcined carbonaceous material prepared in (1)-1 was heated to 2000° C. at a temperature-raising rate of 50° C./hour in a nitrogen atmosphere, while using an electric oven and was calcined at the same temperature for 60 min to obtain Carbonaceous material No. 2.

(1)-3 Carbonaceous material No. 3

After blending 65% by weight of a material obtained by calcining previously the oxidized pitch particles (made by KUREHA KAGAKU KOGYO K.K. under the trade name of MH-P, of an average particle diameter of 5 micrometers) in a nitrogen atmosphere at 850° C. and 35% by weight of the same phenol rssin as that used in 1)-1, the thus obtained mixture aas supplied into a predetermined metal mold and was molded under the conditions of a molding temperature of 140° C., a molding pressure of 100 kg/cm² and a pressure-retaining time of 30 min. The thus molded material was heated to 2000° C. at a temperature-raising rate of 50° C./hour in a nitrogen atmosphere while using an electric oven, and was calcined at the temperature for 60 min to obtain Carbonaceous material No. 3.

(1)-4 Carbonaceous material No. 4

A commercialized graphite material (made by TOYO Carbon K.K. under the trade name of A-280 of a bulk density of 1.7 g/cm³) was used as Carbonaceous material No. 4.

Note: Of any pair of the above-mentioned carbonaceous materials, one of the pair was processed by molding or mechanical processing to provide depressed parts thereto, the thus depressed parts being the non-joining parts and the ratio of the total area of the non-joining parts to the total area of the joining surface being 50%.

(2) Flexible graphite sheet

Commercialized flexible graphite sheets (made by Union Carbide Corporation, under the trade name of of 0.25 mm in thickness, 1.2 g/cm³ in bulk density and the coefficient of compression strain of $1 \times 10^{-3}$ cm²/kg) were used for the purpose.

(3) Adhesive

Into 100 parts by weight of methyl ethyl ketone, 80 parts by weight of the same phenol resin as that used in 1)-1 were dissolved at ordinary temperature to prepare the adhesive.

(4) Joining conditions

After applying the adhesive on the respective joining surfaces of the carbonaceous materials to be joined, the thus treated carbonaceous materials were joined together under the conditions of a joining temperature of 130° C., a joining pressure of 5 kg/cm$^2$ and a pressure-retaining time of 30 min.

(5) Calcination

After joining, the thus joined carbonaceous materials were heated to 2000° C. at a temperature-raising rate of 50° C./hour in a nitrogen atmosphere while using an electric oven and were calcined for 60 min at the temperature. The results are shown in Table 2.

TABLE 2

| Combination of carbonaceous materials | | Results (Number of Products in good joining state*[1]) | |
|---|---|---|---|
| Flat plate | Plate having depressed parts | Joining surface (150 mm × 150 mm) | Joining surface (150 mm × 20 mm) |
| No. 1 + | No. 1 | 10 | 10 |
| No. 1 + | No. 2 | 10 | 10 |
| No. 1 + | No. 3 | 10 | 10 |
| No. 1 + | No. 4 | 10 | 10 |
| No. 2 + | No. 2 | 10 | 10 |
| No. 2 + | No. 3 | 10 | 10 |
| No. 2 + | No. 4 | 10 | 10 |
| No. 3 + | No. 3 | 10 | 10 |
| No. 3 + | No. 4 | 10 | 10 |
| No. 4 + | No. 4 | 10 | 10 |

Note:
*[1] Products of good joining state means the product without any cracks and exfoliation after calcination at 2000° C. when examined by naked eyes.

From the results shown in Table 2, it was made clear that in the case of joining the carbonaceous materials together, the interposition of a flexible graphite sheet between the carbonaceous materials and the provision of non-joining parts on the joining surface result in a good joining state.

COMPARATIVE EXAMPLE 1

The results of joining the carbonaceous materials together without using and with using the same adhesive as that in Example 1 are shown in Table 3. Although each of the carbonaceous materials and the conditions of joining were the same as in Example 1, no depressed parts were provided on each of the carbonaceous materials.

TABLE 3

| Combination of carbonaceous materials | | Results (Number of Products in good joining states) | |
|---|---|---|---|
| Flat plate | Flat plate | Joining surface (150 mm × 150 mm) | Joining surface (150 mm × 20 mm) |
| No. 1 + | No. 1 | 5 | 8 |
| No. 1 + | No. 2 | 0 | 0 |
| No. 1 + | No. 3 | 0 | 0 |
| No. 1 + | No. 4 | 0 | 0 |
| No. 2 + | No. 2 | 4 | 7 |
| No. 2 + | No. 3 | 2 | 3 |
| No. 2 + | No. 4 | 3 | 5 |
| No. 3 + | No. 3 | 2 | 3 |
| No. 3 + | No. 4 | 2 | 3 |
| No. 4 + | No. 4 | 5 | 8 |

Note: without using any flexible graphite sheet.

As are seen in Table 3, in the case of joining the carbonaceous materials relatively similar to each other, favorable state of joining was obtained, however, in other cases, it was impossible to obtain any favorable composite carbonaceous product.

EXAMPLE 2

After joining the following various carbonaceous materials of various dimensions together while interposing GRAFOIL ® therebetween and joining them by using the same adhesive and joining condition as in Example 1, the thus joined materials were calcined at 2000° C. in a nitrogen atmosphere, the results being shown in Table 4.

The joining was carried out by a mode shown in FIG. 1(2), namely, the carbonaceous materials were joined at the surface of the maximum dimension. The experiment was repeated 10 times under the same combination of the carbonaceous materials like Example 1.

Carbonaceous material (2)-1 Carbonaceous material No. 1'

After blending 70% by weight of short carbon fibers (made by KUREHA KAGAKU KOGYO K.K. under the trade name of M-204S, of an average diameter of 14 micrometers and an average length of 400 micrometers) and 30% by weight of the same phenol resin as in Example 1, the thus obtained mixture was supplied into a predetermined metal mold and molded under the conditions of a molding temperature of 130° C., a molding pressure of 50 kg/cm$^2$ and a pressure-retaining time of 20 min.

(2)-2 Carbonaceous material No. 2'

The same material as Carbonaceous material No. 3 obtained in Example 1.

(2)-3 Carbonaceous material No. 3'

The same commercialized graphite material as carbonaceous material No. 4 used in Example 1.

Note: Of any pair of the above-mentioned carbonaceous materials, one of the pair was processed by molding or mechanical processing to provide depressed parts on the joining surface thereof, the thus depressed parts being the non-joining parts.

TABLE 4

| Combination of carbonaceous materials | | Result (Number of Products in good joining state) Dimension of the joining surface (mm square) | | | |
|---|---|---|---|---|---|
| Flat plate | Plate having depressed parts | 150 mm | 300 mm | 700 mm | 1200 mm |
| No. 1' + | No. 1' | 10 | 10 | 10 | 10 |
| No. 1' + | No. 2' | 10 | 10 | 10 | 10 |
| No. 1' + | No. 3' | 10 | 10 | 10 | 10 |
| No. 2' + | No. 2' | 10 | 10 | 10 | 10 |
| No. 2' + | No. 3' | 10 | 10 | 10 | 10 |
| No. 3' + | No. 3' | 10 | 10 | 10 | 10 |

COMPARATIVE EXAMPLE 2

After joining various carbonaceous materials shown in Table 5 together while interposing GRAFOIL ® therebetween and using the same adhesive as in Example 1, the thus joined materials were calcined at 2000° C. in a nitrogen atmosphere, the results being shown in Table 5.

The joining was carried out to join the surfaces of the maximum dimension together in a mode of FIG. 1 (2)

without providing any depressed part on the joining surfaces.

The carbonaceous materials, the flexible graphite sheet, the adhesive and the conditions of joining and calcination as well as the number of repetition of the experiment were the same as in Example 2.

TABLE 5

| Combination of carbonaceous materials | | Result (Number of Products in good joining state) | | | |
|---|---|---|---|---|---|
| Flat plate | Flat plate | Dimension of the joining surface (mm square) | | | |
| | | 150 mm | 300 mm | 500 mm | 700 mm |
| No. 1' + | No. 1' | 10 | 10 | 10 | 10 |
| No. 1' + | No. 2' | 10 | 10 | 10 | 9 |
| No. 1' + | No. 3' | 10 | 10 | 10 | 9 |
| No. 2' + | No. 2' | 10 | 10 | 9 | 7 |
| No. 2' + | No. 3' | 10 | 10 | 9 | 7 |
| No. 3' + | No. 3' | 10 | 10 | 9 | 7 |

In the joining method in Comparative Example 1 wherein the total area of one of the surfaces of the carbonaceous materials is utilized in joining without using any interposed flexible graphite sheet, it was almost impossible to obtain any good joining state.

However, as are seen in Comparative Example 2, even by the use of the same carbonaceous materials as in Comparative Example 1, it was possible to obtain the carbon product free from any curvature, crack and exfoliation in the case of joining the carbonaceous materials of below 500 mm square together by utilizing the flexible graphite sheet interposed between the carbonaceous materials. However, in the case of joining the carbonaceous materials of not less than 700 mm square together, the yield of the product reduced.

Under these situations, according to the present invention, as are seen in Example 2, it is possible to obtain the carbon products of a dimension of as large as 700 mm square, which are free from any curvature, crack and exfoliation, in a yield as high as 100%, and in addition, it is possible to obtain the carbon product of larger dimension, for instance, 1200 mm square.

EXAMPLE 3

Production of carbonaceous flat plates (3)-1 Carbonaceous mold

After blending 40% by weight of the same short carbon fibers as in Example 1, 30% by weight of the same phenol resin as in Example 1 and 30% by weight of particles of polyvinyl alcohol (made by NIPPON GOSEIKAGAKU K.K. of an average particle diameter of 180 micrometers), the thus obtained mixture was supplied into a predetermined metal mold and molded under the molding conditions of a molding temperature of 130° C., a molding pressure of 50 kg/cm² and a pressure-retaining time of 20 min to produce a carbonaceous mold.

(3)-2 Impregnated carbon fiber paper

Sheets of carbon fiber paper were prepared from carbon fibers (made by KUREHA KAGAKU KOGYO K.K. under the trade name of C107S of 7 mm in an average length) of 100 g/m² (areal weight), fibers of polyvinyl alcohol (made by NIPPON GOSEI KAGAKU K.K. of 3 mm in an average length) of 30 g/m² and wood pulp of 5 g/m² as joints by paper making.

The thus prepared carbon fiber paper was impregnated with a dilute solution of the same phenol resin as in Example 1 in methyl ethyl ketone (a concentration of the phenol resin of 10% by weight) to obtain the sheet of carbon fiber paper impregnated with 20 g of the phenol resin per 100 g of the carbon fiber paper.

EXAMPLE 4

Preparation of the electrode part material (4)-1 Non-calcined electrode part material On the lower metal mold shown in FIG. 4, the carbonaceous mold prepared in (3)-1 of Example 3 was placed; a middle metal mold was placed thereon; a mixture of 40% by weight of the same short carbon fibers as in Example 1, 30% by weight of the same phenol resin as in Example 1 and 30% by weight of the same particles of polyvinyl alcohol as in Example 3 (the mixture being used for forming the carbonaceous protuberances) was supplied into the hollow spaces of the middle metal mold and the thus arranged materials were subjected to hot-pressing at 140° C. under a pressure of 10 kg/cm² for 30 min to obtain a non-calcined electrode part material as is shown in FIG. 3(1), which had the shape and arrangement of the carbonaceous protuberances wherein d was 2 mm and Sr/Se was 0.5.

(4)-2 Another non-calcined electrode part material:

On the lower metal mold shown in FIG. 4, a sheet of carbon fiber paper prepared in (3)-2 of Example 3 was placed, and after placing a middle metal mold thereonto, the mixture for forming the carbonaceous protuberances prepared in the above (4-1) was supplied thereto. Then, an upper metal mold was placed on the mixture and the thus arranged materials were subjected to hot-pressing at 140° C. and under a pressure of 10 kg/cm² for 30 min to obtain another non-calcined electrod part material having the shape of cross-section and the arrangement of the carbonaceous protuberances as shown in FIG. 3(2), the d being 2 mm and Sr/Se being 0.36.

(4)-3 Calcination:

The non-calcined carbonaceous electrode part materials prepared in (4)-1 and (4)-2 were heated to 2000° C. at a temperature-raising rate of 50° C./hour in a nitrogen atmosphere while using an electric oven and calcined for 60 min at the temperature to obtain the calcined carbonaceous electrode part materials, respectively.

EXAMPLE 5

Preparation of electrode part materials in one carbon body (5)-1

Into a metal mold of a predetermined shape, the mixture for forming the carbonaceous protuberances shown in (4)-1 of Example 4 and the carbonaceoss mold prepared in (3)-1 of Example 3 were supplied, and the thus supplied materials were subjected to hot-pressing at 140° C. under a pressure of 50 kg/cm² for 30 min to obtain the non-calcined electrode part material similar to (4)-1 of Example 4.

(5)-2

The thus obtained non-calcined electrode part material was calcined in the same manner as in (4)-3 of Example 4 to obtain the carbonaceous electrode part material.

EXAMPLE 6

Production of an electrode substrate

After applying the same adhesive as that used in Example 1 onto each surface of two GRAFOIL ® (0.1 mm in thickness, 1.2 g/cm$^3$ in bulk density and 1×10$^{-3}$ cm$^2$/kg in coefficient of compression strain) an one commercial graphite material (of a sheet form, made by TOYO Carbon Co., Ltd., under the trade name of A-280, 1.7 g/cm$^3$ in bulk density) for the separator, they were joined together with each two of the following six kinds of the already prepared carbonaceous materials at 130° C. under a pressure of 5 kg/cm$^2$ for 30 min.

Carbonaceous materials used in Example 6

1. Non-calcined electrode part material obtained in (4)-1 of Example 4.
2. Another non-calcined electrode part material obtained in (4)-2 of Example 4.
3. Calcined electrode part material obtained in (4)-3 of Example 4 based on (4)-1 of Example 4.
4. Calcined electrode part material obtained in (4-3) of Example 4 based on (4)-2 of Example 4.
5. Non-calcined electrode part material obtained in (5)-1 of Example 5.
6. Calcined electrode part material obtained in (5)-2 of Example 5.

Then, the thus joined materials were heated to 2000° C. at a temperature-raising rate of 50° C./hour in a nitrogen atmosphere and calcined for 60 min at the temperature to obtain 6 kinds of electrode substrates, the each electrode substrate being prepared in the respective dimensions of 100 mm sq., 170 mm sq., 350 mm sq. and 650 mm sq. with a repetition of 10 times every each size of 6 kinds of the electrode substrate.

As a result, as are shown in Table 1, no inferior products were found in 60 products, and the superiority of the carbon products as the electrode substrate for fuel cells according to the present invention and the process for producing thereof to the conventional products and the process for producing thereof were confirmed, respectively.

In the above procedure, physical properties of the electrode substrate prepared by using non-calcined electrode part material obtained in (4)-1 of Example 4 are shown in Table 6.

TABLE 6

| | Gas-impermeable layer | | Gas-diffusion layer | |
|---|---|---|---|---|
| | Carbon plate for separator | Graphite sheet*[1] | Porous Carbonaceous flat plate | Protuberant parts |
| Thickness (mm) | 0.4 | 0.6 0.2 | 0.4 | 1.0 |
| Bulk density (g/cm$^3$) | 1.45 | 1.2 | 0.58 | 0.62 |
| Porosity (%)' | — | — | 60 | 56 |
| Gas-permeability (ml/cm · hour · mmAq) | 3 × 10$^{-6}$ | | 1500 | — |
| Average porediameter (micrometer) | — | — | 50 | 50 |
| Load at break (kg) | | | 0.8 | |
| Electric resistance (ohm · cm$^2$) | | | 18 × 10$^{-3}$ | |
| Thermal resistance (m$^2$ · hour · °C./Kcal) | | | 5 × 10$^{-3}$ | |

Note:
*[1]Two pieces of the graphite sheets were used.

What is claimed is:

1. A carbon product comprising carbonaceous materials and flexible graphite sheets interposed between said carbonaceous materials, wherein (1) said carbonaceous materials and said flexible graphite sheet are joined together, (2) the thus joined materials have been integrated by calcination as a unitary carbon body in an inert atmosphere, (3) the joining surface of at least one of said carbonaceous materials comprises both joining parts and non-joining parts which have an optional shape and are uniformly arranged on the joining surface, (4) the ratio of the total area of said non-joining parts in said joining surface of said carbonaceous material to the total area of said joining surface is from 0.20 to 0.80, and (5) the value of the difference of the rate (%) of linear expansion and contraction at calcination between two said carbonaceous materials to be subjected to mutual joining via said flexible graphite sheet is not more than 3%.

2. A carbon product according to claim 1, wherein said carbonaceous material having said non-joining parts is a plate having depressed parts.

3. A carbon product according to claim 1, wherein the parts of said flexible graphite sheet, corresponding to said non-joining parts of said carbonaceous material, have been removed.

4. A carbon product according to claim 1, wherein the ratio of the total area of said non-joining parts on said joining surface of said carbonaceous material to the total area of said joining surface is from 0.30 to 0.70.

5. A carbon product according to claim 1, wherein said carbon product has been calcined as a whole at a temperature of now lower than 800° C. in an inert atmosphere.

6. A carbon product according to claim 1, wherein said carbonaceous materials are selected from the group consisting of
   (1) molded carbonaceous materials comprising a carbonaceous aggregate and a binder, optionally and an organic granular substance,
   (2) carbonaceous materials obtained by calcining molded materials of the above (1) in an inert atmosphere,
   (3) molded carbonaceous materials comprising a graphitic aggregate and a binder, and
   (4) carbonaceous materials obtained by calcining molded materials of the above (3) in an inert atmosphere.

7. A carbon product according to claim 6, wherein said carbonaceous aggregate is at least one kind of aggregate selected from the group consisting of carbon fibers, carbon particles and oxidized pitch particles.

8. A carbon product according to claim 6, wherein said binder is at least one kind of binder selected from the group consisting of phenol resins, furan resins, epoxy resins, petroleum pitches and coal pitches.

9. A carbon product according to claim 6, wherein said graphitic aggregate is graphite particles, easily graphitizable carbonaceous particles or both.

10. A carbon product according to claim 1, wherein said flexible graphite sheet is prepared by compressing expanded graphite particles obtained by subjecting graphitic particles of not more than 5 mm in diameter to acid-treatment and further to heating treatment and have a thickness of not more than 1 mm, a bulk density of 0.5 to 1.5 g/cm$^3$ and a coefficient of compression strain of not less than 10$^{-4}$cm$^2$/kg.

11. A carbon product according to claim 1, wherein said carbonaceous material having non-joining parts of the joining surface is an elecrode part material comprising a porous carbonaceous flat plate which has a plurality of carbonaceous protuberances uniformly arranged on the joining surfaces thereof, and said carbonaceous protuberances have been joined to the other of said carbonaceoss materials interposing said flexible graphite sheet therebetween.

12. A unitary electrode substrate for fuel cells, which substrate comprises (1) a carbonaceous material for a separator which bulk density is not less than 1.2 g/cm$^3$, (2) flexible graphite sheets placed on each of and joined to the two surfaces of said carbonaceous material for a separator, and (3) a plurality of carbonaceous protuberances on outer surfaces of said flexible graphite sheets and a pair of porous carbonaceous flat plates on outermost surfaces of the electrode substrate as an electrode materials, wherein all of the materials of said electrode substrate is integrated as a unitary carbon body by calcination in an inert atmosphere, and the value of the difference of linear expansion and contraction rates at calcination between the carbonaceous material for the electrode material and the carbonaceous material for the separator is not more than 3%, and the ratio (Sr/Se) of the total area of cross section of said carbonaceous protuberances, which cross section is parallel to a surface of said carbonaceous material for said separator (Sr), to the total area of the joining surface of said porous carbonaceous flat plate (Se) is from 0.2 to 0.8.

13. An electrode substrate according to claim 12, wherein the space between the neighboring protuberances is not more than 10 mm.

14. An electrode substrate according to claim 12, wherein said carbonaceous protuberances are arranged in series.

15. An electrode substrate for fuel cells according to claim 12, wherein said carbonaceous protuberances are arranged in an alternating pattern.

16. An electrode substrate according to claim 12, wherein said porous carbonaceous flat plates have an average bulk density of 0.25 to 0.9 g/cm$^3$ and a gas-permeability of not less than 30 cm$^2$/hour mmAq., and an average bulk density of said carbonaceous protuberances is 0.40 to 1.8 g/cm$^3$.

17. A unitary electrode substrate for fuel cells, which substrate comprises:
(1) a carbonaceous material for a separator which bulk density is not less than 1.2 g/clm$^3$,
(2) a flexible graphite sheets placed on each of and joined to the two surfaces of said carbonaceous material for a separator.
(3) a plurality of carbonaceous protuberances on outer surfaces of said flexible graphite sheets and a pair of porous carbonaceous flat plates on outermost surfaces of the electrode substrate as an electrode material, wherein (i) all of the materials of said electrode substrate is integrated as a unitary carbon body by calcination in an inert atmosphere, and (ii) a plurality of passages for gaseous reactants are defined by (a) a flexible graphite sheet or the combination of a flexible graphite sheet and the carbonaceous separator, (b) the plurality of carbonaceous protuberances, and (c) the porous carbonaceous flat plate, (iii) the carbonaceous protuberances are arranged for uniform gaseous reactant distribution within the passages formed by the protuberances, (iv) the ratio (Sr/Se) of the total area of cross section of said carbonaceous protuberances, which cross section is parallel to a surface of said carbonaceous material for said separator (SR), to the total area of the joining surface of said porous carbonaceous flat plate (Se) is from 0.2 to 0.8, and (v) the value of the difference of linear expansion and contraction rates at calcination between the carbonaceous material for the electrode material and the carbonaceous material for the separator is not more than 3%.

* * * * *